United States Patent Office 2,902,386
Patented Sept. 1, 1959

2,902,386
CARBON ELECTRODE OIL IMPREGNATION METHOD

Carl C. Hardman, Parma Heights, Ohio, assignor to Diamond Alkali Company, Cleveland, Ohio, a corporation of Delaware No Drawing. Application October 22, 1956
Serial No. 617,250

16 Claims. (Cl. 117—61)

This invention relates to improvements in electrolytic cell carbon electrodes and more particularly is concerned with a new and improved treatment of polymerizable oil-containing carbon electrodes for the use in chlorine-alkali type electrolytic cells and to the electrodes so prepared.

While details vary somewhat in commercial production of carbon electrodes, they typically are prepared by mixing finely-divided coke with the desired proportions of a binder, usually a coal tar residue pitch, at a temperature sufficient to melt the binder. The resultant mixture is then extruded and the thus-formed structures baked, e.g., at a temperature of about 1800° F., to remove volatile matter. Electrodes so produced may advantageously be treated in accordance with the present invention. Superior results are obtained in many instances, however, when the electrode is "graphitized," i.e., the carbon crystal structure is converted to the graphitic crystal structure by heating one or more times to a temperature in the range from about 4150°–5000° F.

Up to this time a number of methods have been prepared for increasing the durability and useful life of carbon electrodes as conventionally employed in various electrolytic cells, notably chlorine-alkali cells wherein aqueous brine solutions are electrolyzed to yield caustic soda, chlorine and hydrogen. Prior suggestions have envisioned the impregnation of such an electrode with a drying oil which oil is then allowed to dry or harden in situ over a period of six months or more. In some instances, such treatment, indeed, is advantageous in providing a more durable electrolyte-resistant electrode. However, in addition to the difficulty imposed by the substantial time interval between electrode treatment and availability for use, there often are encountered difficulties in the operation of an electrolytic cell when a thus-treated electrode is first placed in use. Since the drying oil in the electrode frequently dries or hardens very slowly, and, at times, non-uniformly, often the oil is only partially hardened or dried, unless subjected to an extended period of aging before the electrode is first placed in service.

As a result leaching out of the partially-cured oil by the electrolyte and chlorination thereof in a chlorine-alkali cell is encountered. Such chlorination not only reduces the chlorine output of the cell, and introduces undesirable by-products but, an additional problem is involved since the finely-divided chlorinated oil is deposited in the cell, typically on the diaphragm of a diaphragm type chlorine-alkali cell, thus rapidly reducing the diaphragm porosity and generally completely plugging the diaphragm in a short time. A further problem involved in the use of such electrodes is that any such chlorination of oil forms by-product hydrochloric acid in the electrolyte which hydrochloric acid of course, undesirably reduces the pH of the anolyte.

In an effort to avoid these difficulties, various treatments in addition to the long-term aging of oil-impregnated electrodes prior to use, have been proposed. For example, it has been suggested to use special catalytic curing agents or additives with the oils to facilitate drying or curing. While such additives may well be advantageous in certain instances, their use generally increases the cost of electrode treatment processing operations.

It is, therefore, a principal object of this invention to avoid the difficulties heretofore encountered in the operation of electrolytic cells employing oil-impregnated carbon electrodes which does not require aging of the electrodes prior to use and which permits processing while the electrodes are maintained in one container in a manner adequately to accomplish substantially complete polymerization of a polymerizable oil within said electrode.

In accordance with the present invention, a carbon electrode is treated to improve its operating characteristics in an electrolytic cell by impregnating the electrode with a polymerizable oil and subjecting the thus-impregnated electrode to a superatmospheric pressure and oxidizing atmosphere to effect polymerization of the oil in situ within said electrode within a relatively short time.

More specifically, the present invention involves treating a carbon electrode by impregnating the electrode with a polymerizable oil and subjecting the thus-impregnated electrode to heat and a superatmospheric pressure oxidizing atmosphere thereby to effect substantially complete polymerization of the oil within the pores of the electrode. Even more specifically, the practice of the present invention desirably comprises impregnating a deaerated electrode with a polymerizable oil, notably linseed oil, removing a portion of the adsorbed oil and subjecting the thus-impregnated electrode to an elevated temperature, an oxidizing atmosphere and a superatmospheric pressure, preferably provided by compressed air, to effect polymerization of the oil in situ within said electrode.

It should be appreciated that this invention does not involve, nor may its advantageous results be obtained by, simply heating an oil-impregnated electrode either in air or steam, or inert atmosphere. On the contrary, the combination of process steps described herein is required to effect the substantially complete, rapid curing or polymerization of oil in the electrode.

In practice, the method of the present invention preferably comprises deaerating a carbon electrode in a jacketed impregnator which electrode typically may have an initial porosity of 30%, i.e., 30% of the volume occupied by the electrode in air, and a density of about 1.65 g./cc., impregnating the deaerated electrode with a polymerizable oil, first allowing atmospheric pressure to force the polymerizable oil, notably linseed oil, into the deaerated electrode maintained under 1 to 2 inches Hg absolute pressure, generally completing the impregnation by application of a superatmospheric pressure, typically 50–500 p.s.i.g., preferably 100 p.s.i.g., of an inert gas, e.g., nitrogen, carbon dioxide, or the like, and in many instances applying heat, e.g., using 150 p.s.i.g. steam in the jacket of the impregnator, the impregnation typically occupying 10 to 30 minutes.

The thus-impregnated electrode is subjected to a number of exposures, typically 6–12, preferably 8, to high pressure steam 150 p.s.i.g. followed by venting or other rapid reduction of steam pressure, conventionally termed "steam blows," which serve to facilitate removal of a portion of the oil from said electrode to obtain an oil content of about 8% by weight or less. Any exuded oil on the surface of the electrode then is stripped therefrom with steam or otherwise.

Following this treatment, the electrodes are exposed to a superatmospheric pressure of air, preferably 3–10 atmospheres, an optimum pressure in many instances being about 5 atmospheres, for a period of time generally of about 1–3 hours, preferably 2 hours. During the pressurization, the electrodes desirably are heated, typically practicable temperatures being from about 150° to 350° F., preferably 300° F. The air preferably is vented and changed at intervals to insure that there always is oxygen present, thus establishing and maintaining an oxidizing atmosphere. A practice of venting at 10 minute intervals is advantageous. If desired, oxygen per se or oxygen-containing gaseous mixtures may be used in lieu of or in addition to air, generally speaking, the higher the oxygen content, the lower the pressure required. In certain instances, if oxygen per se is employed, atmospheric pressure alone is sufficient to effect an advantageous oil cure.

The term "polymerizable oil" as used throughout the specification and claims is intended to refer specifically to linseed oil, which is preferred, as well as to other oils of a similar nature such as tung oil, perilla oil, fish oil, safflower oil, soybean oil, oiticica oil, dehydrated castor oil and the like.

Other oils which in many applications may be employed in lieu of, or in admixture with, the foregoing oils either wholly or in part are coconut oil, palm kernel oil, babassu oil, murumuru oil, palm oil, rape seed oil, mustard seed oil, olive oil, peanut oil, sesame oil, corn oil, cottonseed oil, sunower oil, walnut oil, whale oil, menhaden oil, sardine oil, and herring oil.

The practice of the present invention provides a method of treating carbon electrodes which completely avoids the necessity of an aging period as heretofore been considered essential before using commercially available carbon electrodes, especially in chlorine-alkali type electrolytic diaphragm cells. Moreover, it will be appreciated that in the present invention it may be practiced while the electrodes are maintained in a single container, typically the impregnator or other pressure vessel.

A specifically preferred practice of the present invention involves the following steps, starting with commercially available carbon electrode having a density of about 1.65 g./cc. and a porosity of about 30%. Such electrodes, e.g. graphite anodes, are placed in a jacketed impregnator having at least 30% head room above the anodes. A vacuum (1 or 2 inches' Hg pressure absolute) is applied and maintained for at least 10 minutes to deaerate the anodes. Raw linseed oil is then drawn into the impregnator and atmospheric pressure allowed to force the oil into the anodes.

Steam is then applied to the impregnator jacket and nitrogen or other inert gas introduced into the impregnator at a pressure of about 100 p.s.i.g. to facilitate impregnation of the heated oil into the pores of the anode. After 30 minutes, the nitrogen pressure is released, and excess oil is drained from the impregnator, this oil being recyclable. The anodes are now saturated with oil, i.e., they contain about 15% by weight oil. This concentration of oil desirably is reduced to about 8% by introducing high pressure steam in so called "steam blows" whereby high pressure steam is introduced around the anodes in the impregnator and is rapidly vented to flash off oil. Finally steam is passed over the anodes in a steady stream to strip any exuded oil from the anode surfaces.

Following the steam treatment, compressed air is introduced into the impregnator quickly to establish a superatmospheric pressure of about 5 atmospheres while 150 p.s.i.g. steam is introduced into the impregnator jacket. The compressed air and heat are applied and maintained for periods from about 1 to 8 hours, generally 1 to 3 hours, and preferably about 2 hours, to effect rapid curing of the oil in situ within the electrodes, the compressed air being vented and replenished every 15 minutes during this period to maintain a sufficient oxygen concentration within the impregnator to insure an oxidizing atmosphere.

The thus-treated anodes are found to be free of surface oil, are not responsible for exuding oil in cell operation, and do not cause excessive diaphragm plugging. Moreover, they maintain their original volume longer than conventional commercial anodes, this retention of volume being a critical factor with respect to maintenance of proper electrical current flow in an electrolytic cell, any reduction in volume increasing the distance between electrodes, thereby imposing an increased electrical resistance which must be overcome to maintain a desired current flow. In addition, it will be appreciated that these advantages are realized without the inclusion of catalytic driers.

Anodes treated in accordance with the present invention have been found to exhibit a marked superiority over commercially available anodes as demonstrated in the so-called "smoke test" wherein a treated electrode is heated and the results of heating observed either to be exudation of the oil, thus indicating incomplete curing of the oil within the electrode, or a "smoking" of the oil, thus indicating that the oil does not undesirably exude, even at temperatures at which oil decomposition occurs. In other words, the properly cured oil decomposes before it tends to exude from the electrode. Electrodes treated in accordance with the present invention uniformly reflect a high degree of in situ oil polymerization by smoking when heated instead of exuding the oil.

Another method of demonstrating improvement and superiority of electrodes of the present invention is the so-called "chlorinated brine test" wherein electrodes treated in accordance with the present invention and comparable commercial and untreated carbon electrodes are immersed in hot sodium chloride brine and gaseous chlorine introduced to simulate conditions existing in a chlorine-alkali cell. Using pH measurements to reflect the amount of oil leached from the electrode and chlorinated, thus forming hydrochloric acid which lowers the pH, it is observed that where electrodes treated in accordance with the present invention are used in brine saturated with chlorine, such brine uniformly exhibits a pH of 3 or higher, whereas untreated, and conventionally-treated electrodes cause a lower pH, thus, indicating a leaching out and chlorination of oil from the electrode.

The following examples describe certain ways in which the principle of the invention has been applied but are not to be construed as limiting its scope.

*Example I*

To illustrate improvement in electrode characteristics obtained by the practice of the present invention, carbon electrodes treated in accordance with this invention, comparable carbon electrodes available commercially, and electrodes treated in a manner similar to the present invention except that no superatmospheric pressure oxidizing atmosphere is employed in effecting polymerization of the oil in situ are employed as anodes in chlorine-alkali type cells for six months and their electrical conductivity measured. Expressing the conductivity in terms of inches per ohm, the results obtained are as follows:

| Electrode: | Inches/ohm |
|---|---|
| (1) Unaged oil-impregnated anode | 5,145 |
| (2) Commercially available anode (oil treated) | 5,220 |
| (3) Anode treated in accordance with this invention | 6,025 |

As the above data indicates, the useful life of anodes treated in accordance with this invention is extended as demonstrated by the superior electrical conductivity after six months continuous use in an electrolytic cell.

*Example II*

Further to illustrate the preparation of anodes in accordance with the present invention, 12 carbon anodes for a Tucker-Windecker cell (cylindrical cell employing concentric electrodes) are treated in a steam-jacketed reactor by the following sequence of steps: The anodes are deaerated for 15 minutes by application of vacuum to the reactor, the steam jacket temperature being maintained at 200° F. Raw linseed oil is then drawn into the system to a level at least 20% higher than the tops of the anodes. Nitrogen at a pressure of 100 p.s.i.g.

is then introduced into the hot impregnator to facilitate impregnation. The pressure is then relieved and the oil drained for re-use.

The thus-treated anodes are then subjected to eight steam blows at 100 p.s.i.g. to reduce the oil content from about 15% to about 8% by weight. After this treatment, the steam jacket is filled with cooling water and the impregnator cooled to room temperature.

The thus-treated anodes in the impregnator are then exposed to room temperature air for 10 minutes at which time air pressure is allowed to build up to 5 atmospheres, this superatmospheric pressure being maintained for 30 minutes. Heat is then applied via the steam jacket (325° F.) for one hour with air changes made every 10 minutes in the impregnator to replenish oxygen.

The superatmospheric pressure to which the impregnated electrodes are subjected generally should be as practicable, the upper limit being dictated principally by the equipment available. However, some care should be exercised in the speed with which the pressure is allowed to build up. If pressure is applied too rapidly, a so-called "painted" effect on the electrodes may be encountered whereby oil undesirably is oxidized on the surface. On the other hand, if the pressure build-up is too slow, the oil tends to exude from the electrode and inadequate curing or polymerization of the oil is effected.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of treating a carbon electrode to improve its operating characteristics in an electrolytic cell which comprises impregnating said electrode with a polymerizable oil and subjecting the oil-impregnated electrode to an oxidizing atmosphere at a pressure sufficient to effect polymerization of said oil in situ within said electrode.

2. The method of treating a carbon electrode to improve its operating characteristics which comprises impregnating said electrode with a polymerizable oil and subjecting the impregnated electrode to an oxidizing atmosphere at an elevated temperature while maintaining a superatmospheric pressure thereabout to effect polymerization of said oil within said electrode.

3. The method of treating a carbon electrode to improve its operating characteristics in an electrolytic cell which comprises impregnating said electrode with a polymerizable oil, removing a portion of the adsorbed oil from said electrode, and subjecting the thus-treated electrode to an oxidizing atmosphere at a superatmospheric pressure to effect polymerization of said oil in situ within said electrode.

4. The method according to claim 1 when the impregnated electrode is heated during polymerization of the oil in an oxidizing atmosphere and at a superatmospheric pressure.

5. The method according to claim 1 wherein the superatmospheric pressure comprises compressed air.

6. The method according to claim 1 wherein the superatmospheric pressure comprises compressed air.

7. The method according to claim 2 wherein the superatmospheric pressure comprises compressed air.

8. The method according to claim 3 wherein the superatmospheric pressure comprises compressed air.

9. The method according to claim 4 wherein the superatmospheric pressure comprises compressed air.

10. The method according to claim 3 wherein part of the oil adsorbed is removed by exposing the impregnated electrode, at least once to steam and quickly reducing the steam pressure.

11. The method according to claim 4 wherein part of the adsorbed oil is removed by exposing the impregnated electrode to steam and quickly reducing the steam pressure whereby oil is removed from the electrode.

12. The method according to claim 2 wherein part of the oil is removed by exposing the impregnated electrode to steam and quickly reducing the steam pressure whereby oil is removed from the electrode.

13. The method of treating a carbon electrode to improve its operating characteristics when employed in an electrolytic cell utilizing an aqueous electrolyte, which comprises deaerating said electrode, impregnating the deaerated electrode with a polymerizable oil, exposing the electrode to steam and quickly releasing the pressure thereby to effect removal of a portion of the adsorbed oil, passing steam over the electrode surface to strip therefrom any exuded oil, and exposing the thus-treated electrode to an elevated temperature and a superatmospheric air pressure to effect polymerization of said oil in situ within said electrode.

14. The method according to claim 13 wherein the oil is linseed oil.

15. The method according to claim 13 wherein the air pressure comprises 3 to 5 atmospheres and is maintained for about 1 to 3 hours.

16. The method of treating a carbon electrode which comprises deaerating said electrode, impregnating the deaerated electrode with a polymerizable oil at atmospheric pressure and imposing an inert gas-superatmospheric pressure thereon to facilitate impregnation while heating said electrode for a period of about ten to thirty minutes, removing unadsorbed oil and reducing the adsorbed oil content by exposing the thus-treated electrode, at least once, to steam, followed by rapid steam pressure reduction, thereby to remove a portion of the oil from within said electrode, stripping any exuded oil from said electrode, and subjecting the thus-treated electrode to an elevated temperature and superatmospheric air pressure at about 3 to 10 atmospheres for about 1 to 8 hours with periodic venting and repressurizing of air, thereby to effect polymerization of said oil in said electrode.

References Cited in the file of this patent

UNITED STATES PATENTS

| | | |
|---|---|---|
| 342,175 | Carmichael | May 18, 1886 |
| 2,067,738 | Oji-Ku | Jan. 12, 1937 |
| 2,174,887 | Kiefer | Oct. 3, 1939 |
| 2,368,306 | Kiefer | Jan. 30, 1945 |
| 2,754,231 | Ramodanoff | July 10, 1956 |
| 2,820,728 | Burns | Jan. 21, 1958 |